Nov. 20, 1962 H. GROS 3,064,455
SAFETY FRICTION CLUTCH
Filed Oct. 4, 1961

INVENTOR.
HERMANN GROS.
BY K. H. Mayr
ATTORNEY.

United States Patent Office 3,064,455
Patented Nov. 20, 1962

3,064,455
SAFETY FRICTION CLUTCH
Hermann Gros, Friedrichshafen, Germany, assignor to Maybach-Motorenbau G.m.b.H., Friedrichshafen, Germany, a firm
Filed Oct. 4, 1961, Ser. No. 142,902
Claims priority, application Germany Oct. 20, 1960
4 Claims. (Cl. 64—30)

The invention relates to a safety friction clutch having a pressure disc which can be moved into two extreme positions and which transmits, depending on its position, a high pressure to the friction surfaces for starting purposes and a low pressure during normal operation.

Safety clutches of this kind are interposed between a prime mover and a machine driven thereby in order to protect the machine against overloading by temporary torque peaks. The pressure acting on the friction surfaces of the clutch is so chosen that, during normal operation, the clutch transmits a limited torque which is slightly above the normal operating torque. Starting of the machine, however, because of the static friction and the inertia which must be overcome, requires a much greater torque which causes slipping of the clutch. Therefore, the pressure acting on the friction surfaces of the clutch must be temporarily so much increased that the starting torque is transmitted. Immediately after starting the normal, low friction pressure must be produced so that the clutch can act as a safety clutch.

In a conventional automatic friction clutch the hydraulically or pneumatically produced pressure acting on the friction surfaces is adjusted to transmit the great torque required for accelerating the driven machine during the starting period and to subsequently transmit only the low torque needed for normal operation.

It is an object of the present invention to provide a safety friction clutch for use between a prime mover, for example an internal combustion piston engine, and a machine, for example a light generator, adapted to start the prime mover. When starting a plant of this type the light generator drives the internal combustion engine and thereupon the internal combustion engine drives the light generator whereby the direction of the flow of force through the clutch is reversed. In contradistinction to conventional safety clutches which are adjusted depending on time, the pressure producing disc of the clutch according to the invention is moved into the position for starting the internal combustion engine by the light generator and into the position for driving the light generator by the internal combustion engine depending on the direction of the flow of power or force through the clutch. This makes it possible to reduce the torque transmitted by the clutch, independently of the duration of the starting operation, at the moment the internal combustion engine begins to drive the light generator.

A further object of the invention resides in the provision of a safety friction clutch wherein the friction pressure is adjusted quickly and reliably by purely mechanical means. For this purpose the clutch according to the invention includes a pressure disc forming part of an annular element which is limitedly rotatably and axially movably connected to one clutch half and frictionally engages the second clutch half and which is moved by screw means against the pressure, for example, of a cup spring into the position for starting the internal combustion engine by the light generator.

The novel features which are considered characteristic of the invention are set forth with particularity in the appended claims. The invention itself, however, and additional objects and advantages thereof will best be understood from the following description of an embodiment thereof when read in connection with the accompanying drawing wherein:

Figure 4:
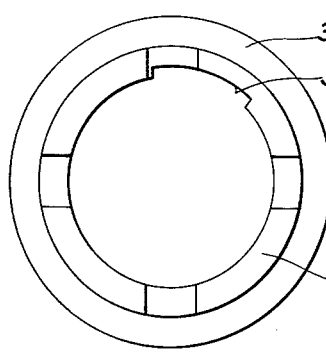
FIG. 4 is an end view of the annular element shown in FIG. 2.
Figure 2:
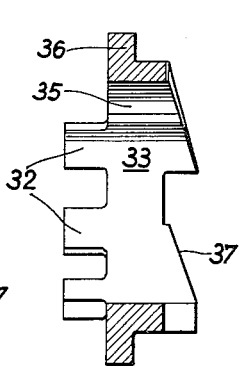
FIG. 2 is a cross sectional view of an annular element forming part of the clutch shown in FIG. 1.
Figure 3:
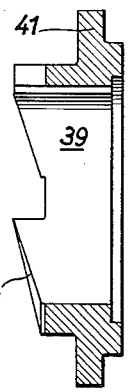
FIG. 3 is a cross sectional illustration of a ring element forming part of the clutch shown in FIG. 1.
Figure 5:
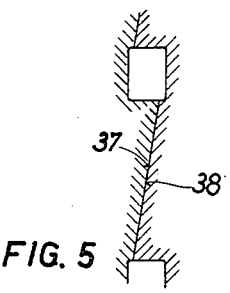
Figure 6:
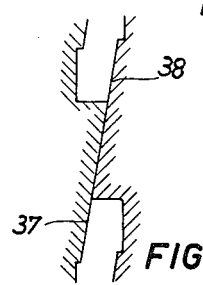

FIGS. 5 and 6 diagrammatically illustrate the relative positions of the elements shown in FIGS. 2 to 4 under different operating conditions.

Referring more particularly to the drawing, numerals 11 and 12 designate the clutch halves of a multiple friction disc clutch which are rotatable in bushings 13 and 14, respectively, resting in support walls 15 and 16, respectively. The clutch half 11 includes a shaft 17 rotatable in bushings 18 and 19 in a hollow shaft 20 forming part of the clutch half 12. A screw head 21 at the end of the shaft 17 retains, through the bushing 19, the axial position of the hollow shaft 20 relative to the shaft 17. Each shaft 17, 20 is provided with a flange 22, 23, respectively. The clutch half 11 includes a hollow cylinder 24 coaxial of and radially spaced from the hollow shaft 20. The interior of the cylinder 24 is provided with axial grooves 25 unrotatably and axially movably supporting outer friction discs 26. The latter are interposed between inner discs 27 axially movably and unrotatably guided by axial grooves 28 at the outside of the hollow shaft 20. A spacer ring 29 separates the group or package of discs 26, 27 from a second disc group or package whose discs have a smaller inside diameter than the discs 26, 27. The second disc package consists of outer discs 30 axially movably and unrotatably guided by the grooves 25 and inner discs 31 axially movably and unrotatably guided by axial extensions 32 of an annular element 33. The spacer ring 29 prevents axial contact of a disc of the package 26, 27 with the ends of the extensions 32.

The element 33 surrounds the hollow shaft 20. Relative rotation of the element 33 on the shaft 20 is limited by a key 34 mounted on the shaft 20 and extending into a recess 35 of limited circumferential extension at the inside of the element 33. The latter is provided with a flange 36 facing the clutch discs and with partial flanks 37 of a quadruple flat thread. The partial flanks 37 cooperate with mating partial flanks 38 provided on a ring element 39 mounted on the hollow shaft 20. Relative rotation of the ring element 39 and of the shaft 20 is prevented by the key 34 extending into an axial groove 40 of the ring 39.

Figure 1:
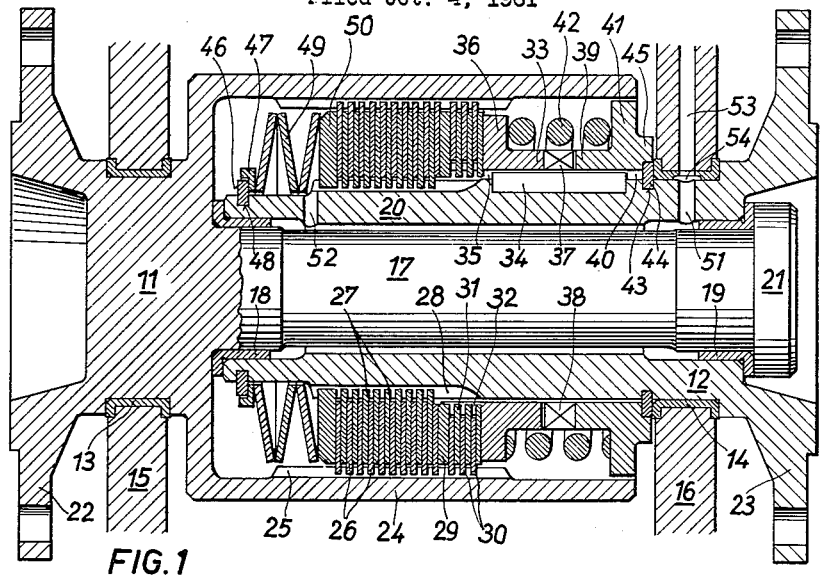
FIG. 1 is a longitudinal sectional view of a clutch according to the invention.

The ring 39 is provided with a flange 41 serving as an abutment for one end of a helical spring 42. The second end of the spring 42 abuts against the flange 36 of the annular element 33. A split ring 44 inserted in an annular groove 43 on the outside of the hollow shaft 20 abuts against the right end, in FIG. 1, of the ring 39, preventing movement of the ring to the right. The split ring 44 is held in the groove 43 by an annular axial extension 45 of the ring 39. A split ring 46 received in an annular groove 48 at the end of the hollow shaft 20 limits the movement to the left of an annular retainer 47 for plate springs 49 which are placed between the retainer 47 and an annular member 50. The latter is at the left end of the disc package 26, 27.

The hollow shaft 20 is provided with bores 51 and 52 forming passages for lubricating oil which enters the hollow of the shaft 20 through a channel 53 in the support wall 16 and through an annular groove 54 in the bushing 14.

When the internal combustion engine is started by the light generator the clutch half 12 is driven by the light generator. At the first moment of the starting period the internal combustion engine which is connected to the clutch half 11 and the outer discs 26 and 30 do not move. The inner discs 27 which cannot rotate relative to the clutch half 12 slip between the outer discs 26. Rotation of the inner discs 31 which are unrotatably connected to the annular element 33 is prevented by the outer discs 30. The annular element 33 is, therefore, frictionally connected to the clutch half 11 and does not rotate relatively thereto. The element 33 stands still at the first moment of starting the plant because of the clearance of the recess 35 which prevents rotation of the element 33 by the key 34. The sections 38 of the flat thread on the ring 39 which is unrotatably connected to the rotating clutch half 12 leave the initial position shown in FIG. 5 and slide on the flank sections 37 of the flat thread on the annular element 33 which is still standing still and move the element 33 in axial direction corresponding to the pitch of the flat threads 37, 38. The flange 36 is thereby moved to its left end position and compresses the disc packages 26, 27 and 30, 31 against the pressure of the plate springs 49 until there is equilibrium between the axial force produced by the cooperating thread flank sections 37, 38 plus the force of the helical spring 42 and the force of the plate springs 49. The flank sections 37, 38 are now in the position shown in FIG. 6 and the torque which can be transmitted has reached the maximum value corresponding to the leftmost position of the flange 36. The outer discs 26 and 30 are now taken along by the inner discs 27 and 31.

The clutch permits a high starting torque until the internal combustion engine begins to operate and drives the light generator. The direction of the force flow through the clutch is now reversed and the inner discs 27 and 31 are taken along by the outer discs 26 and 30. Due to the reversal of the direction of flow of the force through the clutch, flank sections 38 do not exert any axial force on the flank sections 37. The force of the plate springs 49 exceeds the force of the helical springs 42 and moves both disc packages 26, 27 and 30, 31 to the right. The annular element 33 with the flange 36 yields because the flank sections 37 move on the flank sections 38 back into the position shown in FIG. 5 whereby the friction in the small disc package 30, 31 must be overcome. The flange 36 has moved into the right end position which is defined by the equilibrium between the force of the plate springs 49 and the helical spring 42. A relatively small pressure only acts on the discs 26, 27 and 30, 31 and the clutch can transmit only a relatively small torque. If this torque is exceeded, for example by torque peaks caused by torsional vibrations, the clutch slips and damage due to overloading is avoided.

I claim:

1. A safety friction clutch interposed between a prime mover and a machine adapted to start the prime mover, said clutch comprising two halves, one of said halves being connected to the prime mover and the second half being connected to said machine, a group of contiguous friction discs interposed between said halves for frictionally transmitting torque from one of said halves to the second of said halves, spring means placed at and acting on one side of said group of friction discs for pressing said friction discs against one another, and adjusting means for adjusting the pressure exerted by said spring means on said friction discs, said adjusting means including an annular element placed at and frictionally engaging and acting on the opposite side of said group of friction discs against the action of said spring means, said annular element being limitedly rotatably and axially movably supported by said second clutch half, a ring element connected to said second clutch half, screw means interconnecting said annular element and said ring element for pressing said annular element at increasing pressure against said friction discs upon rotation of said second clutch half and said ring element by said machine.

2. A safety friction clutch according to claim 1 wherein said screw means are formed by sections of threads of a multiple flat thread screw and forming part of said ring element, and sections of threads of a multiple flat thread forming part of said annular element and mating with the thread sections forming part of said ring element.

3. A safety friction clutch according to claim 1 wherein said friction discs include a plurality of outer discs unrotatably and axially movably connected with one of said clutch halves and a plurality of inner discs interspersed between said outer discs, a plurality of said inner discs being unrotatably and axially movably connected with said second clutch half and forming with the contiguous outer friction discs a first group of friction discs, the balance of said inner discs being unrotatably and axially movably connected to said annular element and forming with the contiguous outer friction discs a second group of friction discs, a spacer ring being interposed between said two groups of friction discs.

4. A safety friction clutch according to claim 1 wherein a spring is interposed between said second clutch half and said annular element for supplementally pressing the latter against said friction discs.

References Cited in the file of this patent

UNITED STATES PATENTS

| | | |
|---|---|---|
| 994,764 | Loomis | June 13, 1911 |
| 1,832,726 | Newcomb | Nov. 17, 1931 |
| 1,855,937 | Callsen | Apr. 26, 1932 |
| 2,630,775 | Kiekhaefer | Mar. 10, 1953 |